(12) United States Patent
Naito et al.

(10) Patent No.: US 6,664,688 B2
(45) Date of Patent: Dec. 16, 2003

(54) ROTOR FOR A MOTOR

(75) Inventors: Shinya Naito, Iwata (JP); Haruyoshi Hino, Iwata (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 10/215,529

(22) Filed: Aug. 9, 2002

(65) Prior Publication Data

US 2003/0030343 A1 Feb. 13, 2003

(30) Foreign Application Priority Data

Aug. 10, 2001 (JP) ........................ 2001-244614

(51) Int. Cl.[7] ........................ H02K 17/00; H02K 21/12; H02K 16/02
(52) U.S. Cl. ........................ 310/156.01; 310/156.25; 310/156.38; 310/162; 310/156.49; 310/156.51; 310/156.52; 310/156.53
(58) Field of Search ........................ 310/156.01, 156.23, 310/156.38, 162, 156.49–156.56, 156.25

(56) References Cited

U.S. PATENT DOCUMENTS

| | | | | |
|---|---|---|---|---|
| 5,097,166 A | * | 3/1992 | Mikulic | 310/156.83 |
| 5,818,140 A | * | 10/1998 | Vagati | 310/185 |
| 6,087,751 A | * | 7/2000 | Sakai | 310/156.45 |
| 6,121,706 A | * | 9/2000 | Nashiki et al. | 310/168 |
| 6,441,525 B1 | * | 8/2002 | Koharagi et al. | 310/156.56 |

* cited by examiner

Primary Examiner—Nestor Ramirez
Assistant Examiner—J. Aguirrechea
(74) Attorney, Agent, or Firm—Young & Basile, P.C.

(57) ABSTRACT

To provide a rotor for a motor capable of effecting improved torque variation due to improvement in the induced voltage waveform and of effecting improved magnet torque in a permanent magnet type synchronous motor utilizing reluctance torque.

A rotor 11 comprises a core 12 made of a ferromagnetic material, a given member of permanent magnets 14 are mounted in the outer surface of the core 12 circumferentially at equal intervals, and arrangement of the permanent magnets 14 is such that polarities N, S of the permanent magnets on the sides facing a stator are disposed alternately. Also, in the core 12 between the center axis of the core and the permanent magnets 14 are embedded arc-shaped permanent magnets 16 corresponding to the permanent magnets 14, respectively, and arrangement of the permanent magnets 14 is the same as that of the corresponding permanent magnets 16.

20 Claims, 11 Drawing Sheets

PRIOR ART

ROTOR FOR A MOTOR

FIELD OF THE INVENTION

This invention relates to a rotor for a motor such as a permanent magnet type synchronous motor (PM motor) for use in a mobile body such as an electric car.

BACKGROUND OF THE INVENTION

Heretofore, a system has been known as this kind of permanent magnet type synchronous motor, in which the rotor has magnetic saliency so that reluctance torque is utilized effectively, and it is categorized as an embedded magnet type or a surface magnet type, depending on the structure of the rotor.

The embedded magnet type has a structure of permanent magnets being embedded in the rotor, and constitutes a permanent magnet type synchronous motor utilizing reluctance torque.

Figure 10A:
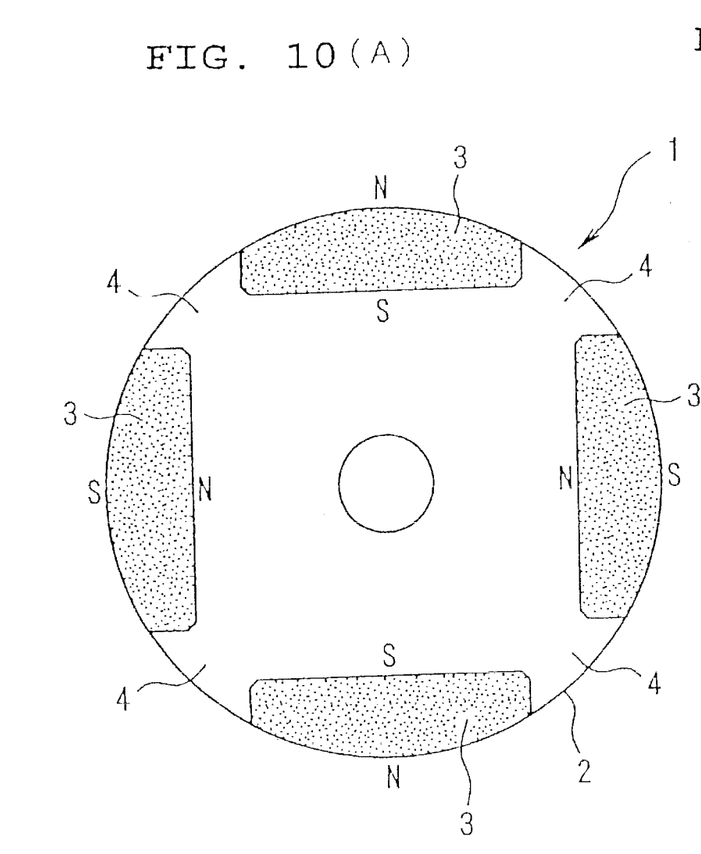
FIG. 10(A) is a plan view of the same, and FIG. 10(B) a side view of the same.
Figure 10B:
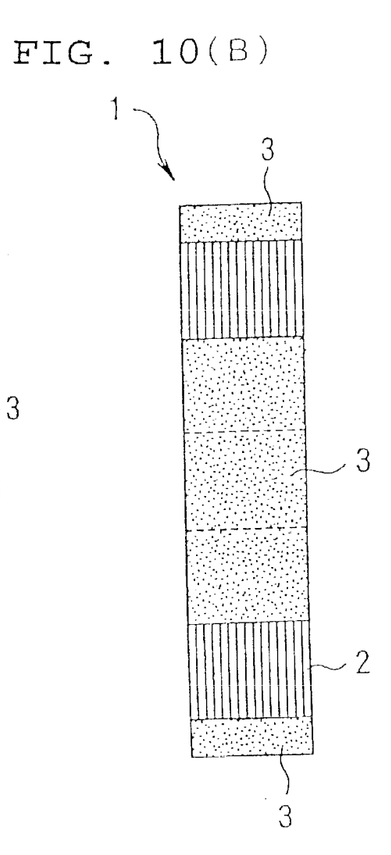

On the other hand, the surface magnet type has a construction in which a rotor 1 is arranged, for example, as shown in FIG. 10. The rotor 1 comprises a core 2 made of a ferromagnetic material, having permanent magnets 3 bonded in the outer surface at a given intervals, and provided with projections 4 between permanent magnets 3. The surface magnet type is a permanent magnet type synchronous motor utilizing reluctance torque generated by the projections 4 of the rotor 1.

However, since in the embedded magnet type, permanent magnets are embedded in the core of the rotor, short circuit of magnetic flux of the permanent magnets happens inside the core.

On the other hand, since in the surface magnet type, short circuit of magnetic flux hardly happens and magnetic flux of the permanent magnets can be utilized effectively, the amount of permanent magnet used can be reduced.

However, since in the surface magnet type, the induced voltage waveform of the winding on a stator facing the magnets contains a lot of higher harmonics, torque variation (torque ripple) of the motor becomes larger, resulting in vibration of the rotor, and noise from the vibration.

In view of the foregoing, a first object of this invention is to provide a rotor for a motor capable of effecting improved torque variation due to improvement in the induced voltage waveform and of effecting improved magnet torque in a permanent magnet type synchronous motor utilizing reluctance torque.

A second object of this invention is to provide a rotor for a motor capable of effecting improved power factor of a permanent magnet type synchronous motor utilizing reluctance torque.

SUMMARY OF THE INVENTION

In order to achieve the first object of this invention, a first aspect of the invention is arranged as follows.

The first aspect is characterized by a rotor for use in matched relation with a stator provided in a permanent magnet type synchronous motor, wherein the rotor comprises a core made of a ferromagnetic material. A given number of first permanent magnets are mounted in the outer surface of the core circumferentially at equal intervals, and the first permanent magnets are arranged such that polarities N, S of the permanent magnets on the side facing the stator are disposed alternately. In the core between the center axis of the core and the first permanent magnets are embedded second permanent magnets corresponding to the first permanent magnets, respectively, and the arrangement of the second permanent magnets is the same as that of the corresponding first permanent magnets.

As described above, in the invention of claim 1, permanent magnets forming the rotor are arranged such that first permanent magnets provided in the outer surface of the core are separated from second permanent magnets embedded in the core.

Therefore, according to the first aspect, if the same total amount of permanent magnet as in a conventional surface magnet type rotor is used, the magnetic flux density generated between the rotor and stator is improved as well as the induced voltage waveform, so that torque variation of the motor can be improved, and magnet torque is also improved due to increased armature interlinkage magnetic flux.

In addition, in order to achieve the second object of this invention, the second and third aspects are arranged as follows.

The second aspect is characterized by a rotor for a motor according to the first aspect, wherein positions of the embedded second permanent magnets are offset from the mounting positions of the first permanent magnets by a predetermined angle in the direction of rotation of the core.

Also, the third aspect is characterized by a rotor for use in matched relation with a stator provided in a permanent magnet type synchronous motor, wherein the rotor comprises a core made of a ferromagnetic material. A given number of permanent magnets are mounted in the outer surface of the core circumferentially at equal intervals, and the permanent magnets are arranged such that polarities N, S of the permanent magnets on the side facing the stator are disposed alternately. The core is formed with projections between the permanent magnets mounted in the outer surface, and each projection has a cutout at the forward end in the direction of rotation of the core.

Features of the second and third aspects of the foregoing construction will be described below.

Since reluctance torque is utilized in the the first aspect or a conventional rotor shown in FIG. 10, the armature magnetic flux will increase. Thus, the power factor of the motor will be decreased. To improve this power factor, it is necessary to suppress the armature magnetic flux, but this will decrease the torque.

To eliminate the foregoing disadvantage, the construction set forth in the second and third aspects is adopted.

That is, in the second aspect, positions of the embedded second permanent magnets are offset from the mounting positions of the first permanent magnets by a given angle in the direction of rotation of the core. Further, in the third aspect, each projection has a cutout at the forward end in the direction of rotation of the core.

In the foregoing construction, since not only little change in magnet torque is effected, but the peak phase (angle of lead) can also be decreased in spite of a slight drop in reluctance torque, the peak value of the resultant torque (magnet torque plus reluctance torque) is hardly lowered.

Further, since in addition to a drop in armature magnetic flux, its phase also changes, the phase difference between the induced voltage and current is decreased, improving the power factor of the motor. Therefore, the maximum output of the motor can be increased, which is effective especially to lower-voltage applications using a battery as a power source.

BRIEF DESCRIPTION OF THE DRAWINGS

The description herein makes reference to the accompanying drawings wherein like reference numerals refer to like parts throughout the several views, and wherein:

FIGS. 1(A)–(B) show the construction of a first embodiment of a rotor for a motor of this invention.

FIGS. 6(A)–(B) show the construction of a second embodiment of a rotor for a motor of this invention.

FIGS. 9(A)–(B) show the construction of a third embodiment of a rotor for a motor of this invention.

FIGS. 10(A)–(B) show the construction of a conventional rotor for a motor.

DESCRIPTION OF THE PREFERRED EMBODIMENT

Now, embodiments of this invention will be described below with reference to the drawings.

The construction of the first embodiment of a rotor for a motor of this invention is described with reference to FIG. 1.

The rotor according to the first embodiment is applied to a permanent magnet type synchronous motor, and used in matched relation with a given stator (not shown) of the permanent magnet type synchronous motor.

Figure 1A:
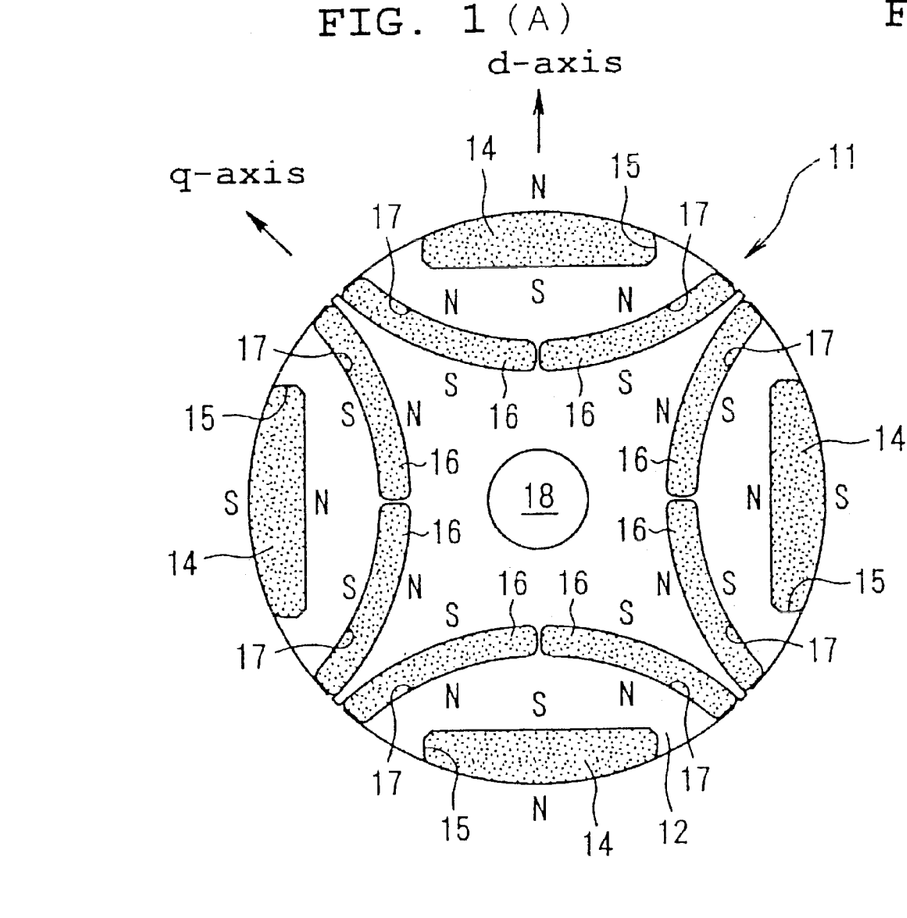
FIG. 1(A) is a plan view of the same, and FIG. 1(B) a side view of the same.
Figure 1B:
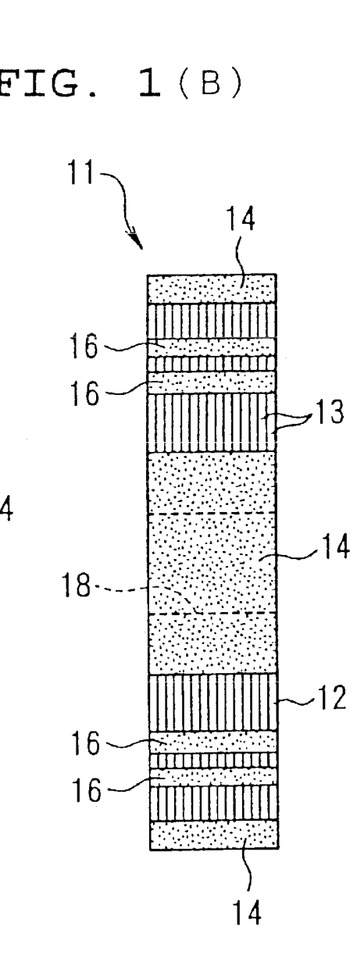

A rotor 11 consists, as shown in FIG. 1, of a core 12 of a ferromagnetic body, which is a laminated steel block 13 made up of, for example, silicon steel sheets, with a given thickness. In the outer surface of the core 12 are mounted a given number (four in this example) of permanent magnets 14 circumferentially at given intervals.

More specifically, in the outer surface of the core 12 are provided circumferentially, for example, four recesses 15, and permanent magnets 14 are housed fixedly in the recesses 15, respectively. Arrangement of the permanent magnets 14 is such that their polarities S, N on the surface side (the side facing an unillustrated stator) are disposed alternately, as shown in FIG. 1.

In the core 12 between the permanent magnets 14 and the center of the core 12 are embedded arc-shaped permanent magnets 16 corresponding to the permanent magnets 14, as shown in FIG. 1. Arrangement of the arc-shaped permanent magnets 16 is the same as that of the corresponding permanent magnets 14, as shown in FIG. 1.

More specifically, the core 12 is formed with arc-shaped grooves 17 running inwardly approximately along the permanent magnets 14 from points on the circumference of the core at an equal distance from both ends of the permanent magnets 14. In the arc-shaped grooves 17 are housed fixedly the arc-shaped permanent magnets 16, respectively.

At the center of the core 12 in the direction of thickness is provided a fitting hole 18 for a rotational shaft (not shown).

In the rotor 11 of FIG. 1, the permanent magnets 16 embedded in the core 12 are arranged in a single layer. However, permanent magnets equivalent to the permanent magnets 16 may be arranged in multiple layers such as two or three layers.

If the rotor of the first embodiment of the foregoing construction is used in a given permanent magnet type synchronous motor, torque T of the motor is written in the following expression (1):

$$T = Pn \times \Phi a \times iq \pm Pn(Ld - Lq) \times id \times iq \qquad (1),$$

Where the first term of the expression (1) represents the magnet torque, and the second term represents the reluctance torque.

In the expression (1), Pn represents the number of magnetic pole pairs of the permanent magnets 14, $\Phi a$ is given as $\Phi a = \sqrt{3/2} \times \Phi f$ ($\sqrt{3/2}$ means the square root of 3/2, and $\Phi f$ is a maximum value of the armature interlinkage magnetic flux by the permanent magnets). Ld, Lq are inductances of d- and q-axes, and id, iq are d- and q-axis components of the armature current.

Now, a test result will be described of the several kinds of comparison tests performed on a rotor of the first embodiment and a conventional rotor shown in FIG. 10, using a given permanent magnet type synchronous motor. In these tests, the total amount of permanent magnet 14, 16 used in the rotor 11 of the first embodiment was the same as that of permanent magnet 3 used in the conventional rotor 1 shown in FIG. 10.

Figure 2:
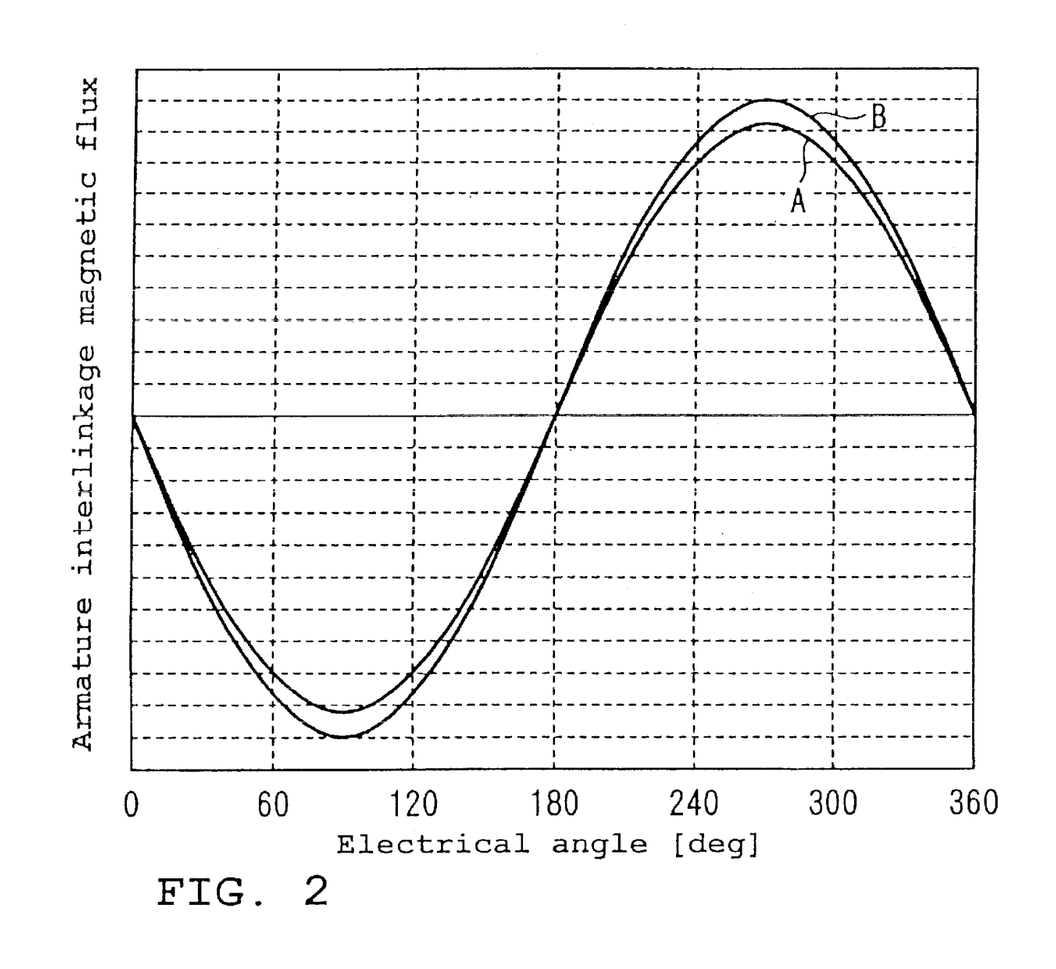
FIG. 2 is a graph showing a comparison of the armature interlinkage magnetic flux.

FIG. 2 shows a comparison of fundamental waveforms of the armature interlinkage magnetic flux; curve A represents a case of a conventional rotor, and curve B a case of a rotor of the first embodiment.

Comparing the waveforms of both cases, the rotor of the first embodiment is about 10% larger in armature interlinkage magnetic flux than the conventional rotor. This means that $\Phi a$ of the expression (1) increases by about 10%, so that the magnet torque of the first term in the expression (1) is improved by about 10%.

Figure 3:
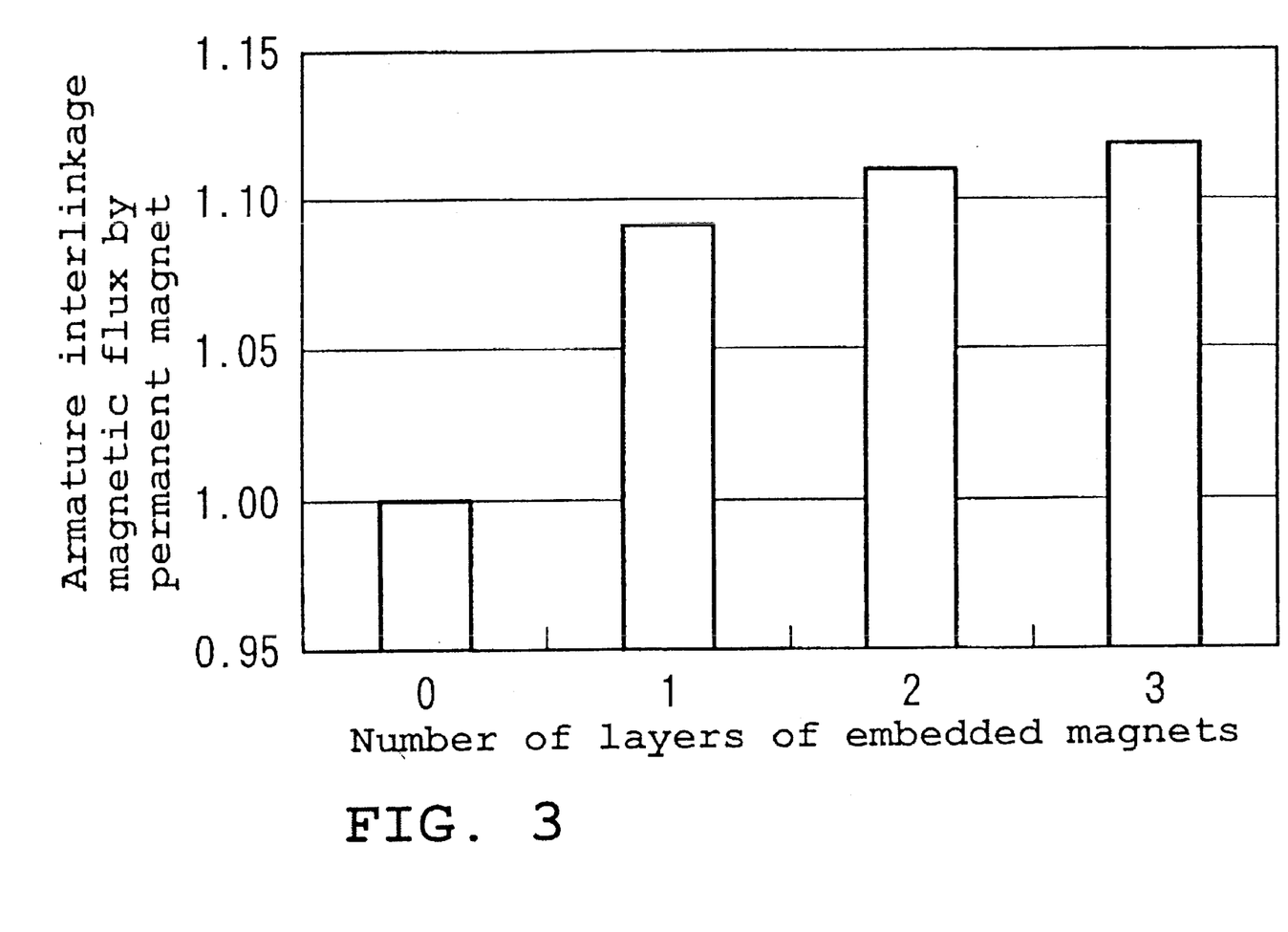
FIG. 3 is a chart showing a comparison of the armature interlinkage magnetic flux against the number of layers of embedded magnets.

FIG. 3 shows a comparison of the armature interlinkage magnetic flux when permanent magnets embedded in the rotor are arranged in two or three layers in addition to the case of the rotor 11 of the first embodiment. From this comparison, it can been seen that when the permanent magnets embedded in the rotor are increased to two or three layers, the armature interlinkage magnetic flux increases with the increase of in the number of layers, thereby increasing the magnet torque.

Figure 4:
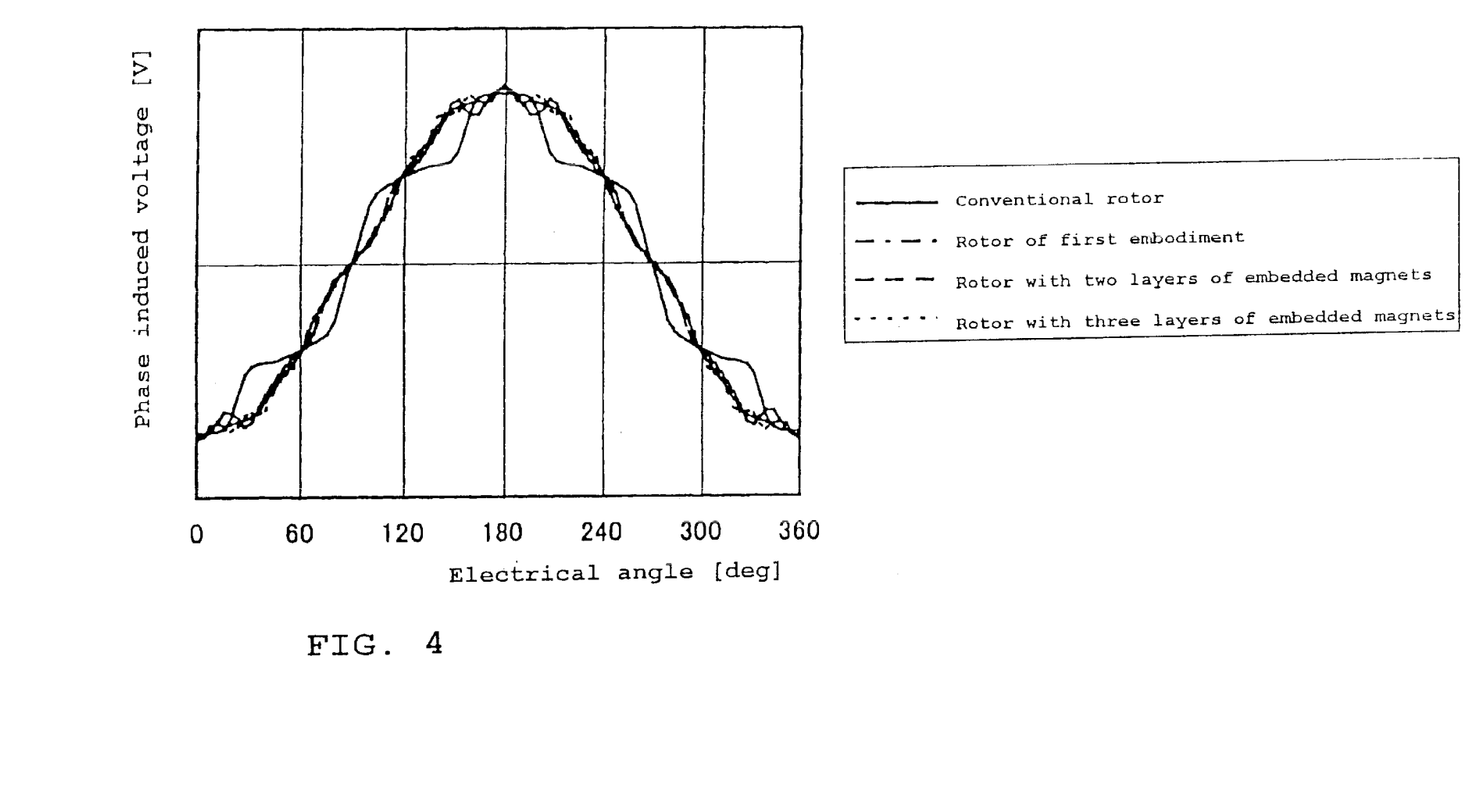
FIG. 4 is a graph showing a comparison of the waveform of the phase induced voltage.

FIG. 4 shows a comparison of waveforms of the phase induced voltage induced in the winding on the stator of a motor.

From this comparison, in the case of a conventional surface type rotor, it can be seen that the phase induced voltage has a stepped shape because of its higher harmonic components, as shown in a solid line. Since the waveform of the torque is represented by the product of an induced voltage and a sinusoidal current supplied to the motor, a larger torque variation is produced in the case of the conventional rotor.

Figure 5:
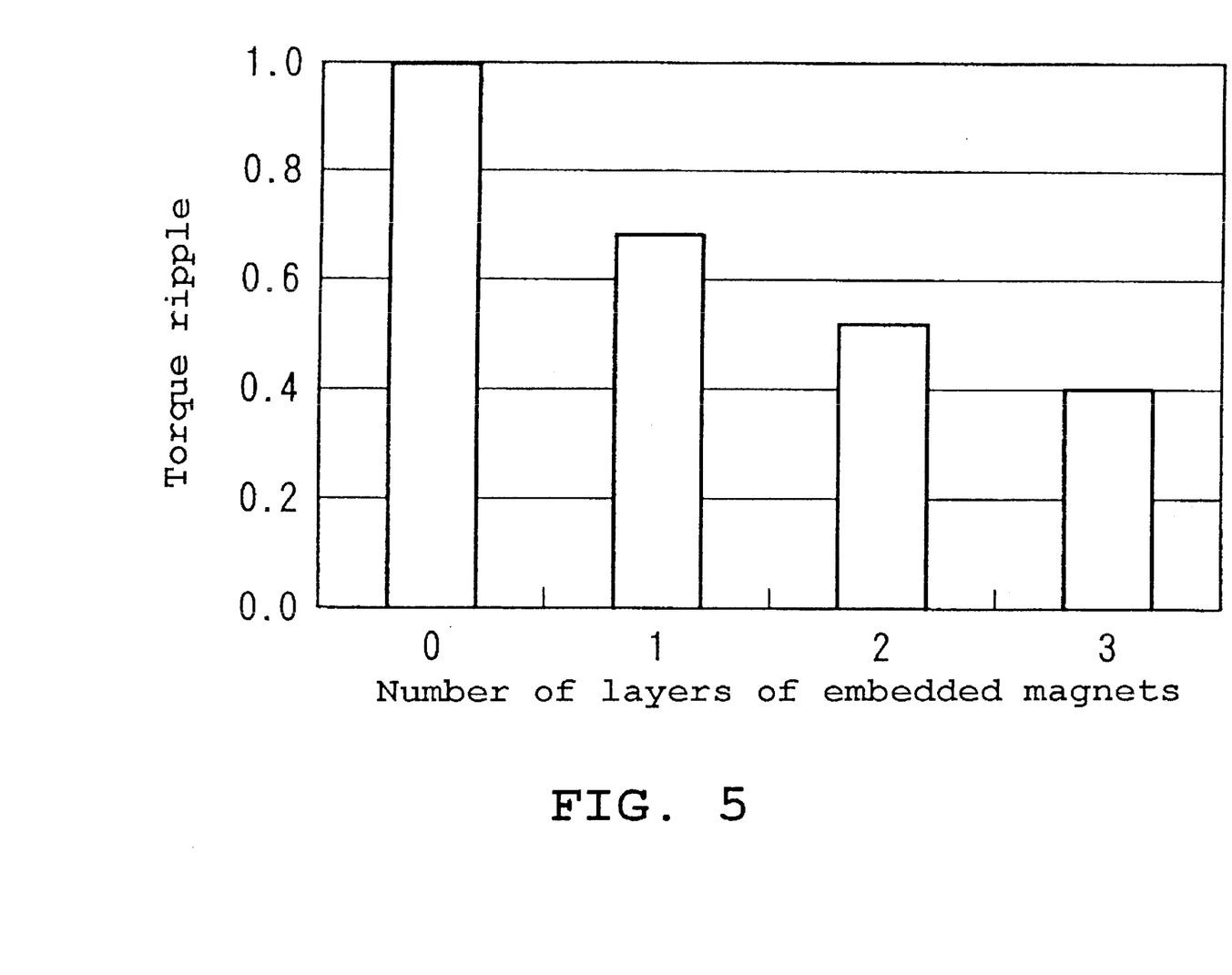
FIG. 5 is a chart showing a comparison of the torque ripple against the number of layers of embedded magnets.

In contrast, in the case of the rotor of the first embodiment, since the waveform of the phase induced voltage is improved, as shown in a dot and dash line, torque variation is also improved. The degree of improvement in torque variation increases for an increased number of embedded magnetic layers in the rotor, and the relation between the number of layers and the degree of improvement in torque variation (torque ripple) is shown in FIG. 5.

The rotor 11 of the first embodiment 1 is an example of a rotor when the motor is of an inner rotor type. However, like the case of the rotor 11, an idea that permanent magnets 14 provided in the outer surface of the core are separated from permanent magnets 16 embedded in the core, may be applied to a rotor when the motor is of an outer rotor type.

Now, the construction of the second embodiment of a rotor for a motor of this invention will be described with reference to FIG. 6.

In the conventional rotor 1 shown in FIG. 10, since reluctance torque generated by projections 4 is utilized, the armature magnetic flux will increase. Therefore, the power factor of the motor will be lowered. To improve this power factor, it is necessary to suppress the armature magnetic flux, but this disadvantageously lowers the torque.

Figure 6A:
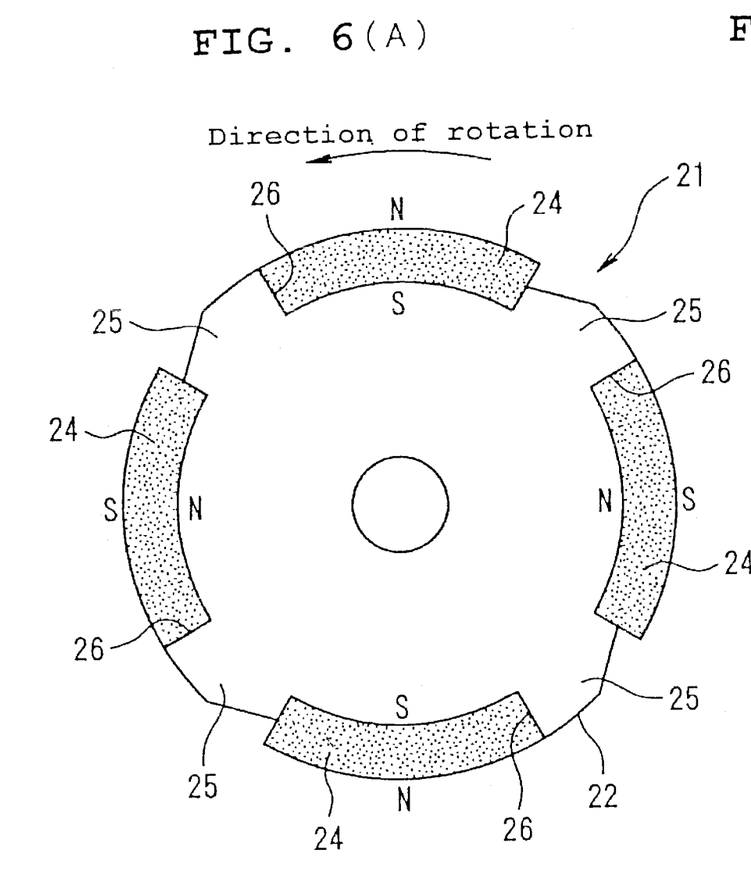
FIG. 6(A) is a plan view of the same, and FIG. 6(B) a side view of the same.
Figure 6B:
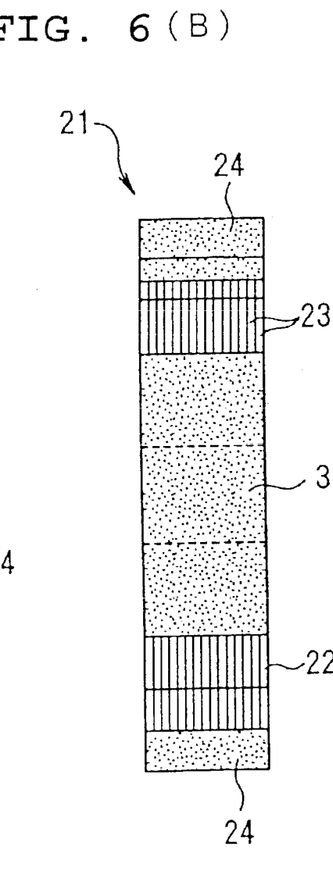

Thus, to eliminate such disadvantage, a rotor 21 according to the second embodiment is devised as shown in FIG. 6.

That is, the rotor 21 comprises, as shown in FIG. 1, of a core 22 of a ferromagnetic body, which is a laminated steel block 23 made up of, for example, silicon steel sheets, with a given thickness. In the outer surface of the core 22 are mounted a given number (four in this example) of permanent magnets 24 circumferentially at given intervals. Further, the core 22 is formed with projections 25 for generating reluctance torque, located between the permanent magnets 24.

More specifically, the core 22 is formed, in the outer surface, with a given number (four in this example) of recesses 26 circumferentially at given intervals, and also with arc-shaped projections 25 between the recesses 26. The permanent magnets 24 are housed fixedly in the recesses 26. Arrangement of the permanent magnets 24 is such that their polarities S, N on the surface side are disposed alternately, as shown in FIG. 6.

Further, each projection 25 is cut down obliquely at the forward end in the direction of rotation of the core 22, as shown in FIG. 6, so that the projection 25 is formed of a slanting and an arc portion. Therefore, the projections 25 are identical in shape, but as shown in FIG. 6, they are disposed on the core 22 laterally unsymmetrically.

Now, a test result will be described of the several kinds of comparison tests performed on a rotor of the second embodiment of the foregoing construction and a conventional rotor shown in FIG. 10, using a given permanent magnet type synchronous motor. In these tests, the total amount of permanent magnet 24 used in the rotor 21 of the second embodiment was the same as that of permanent magnet 3 used in the conventional rotor 1 shown in FIG. 10.

Figure 7:
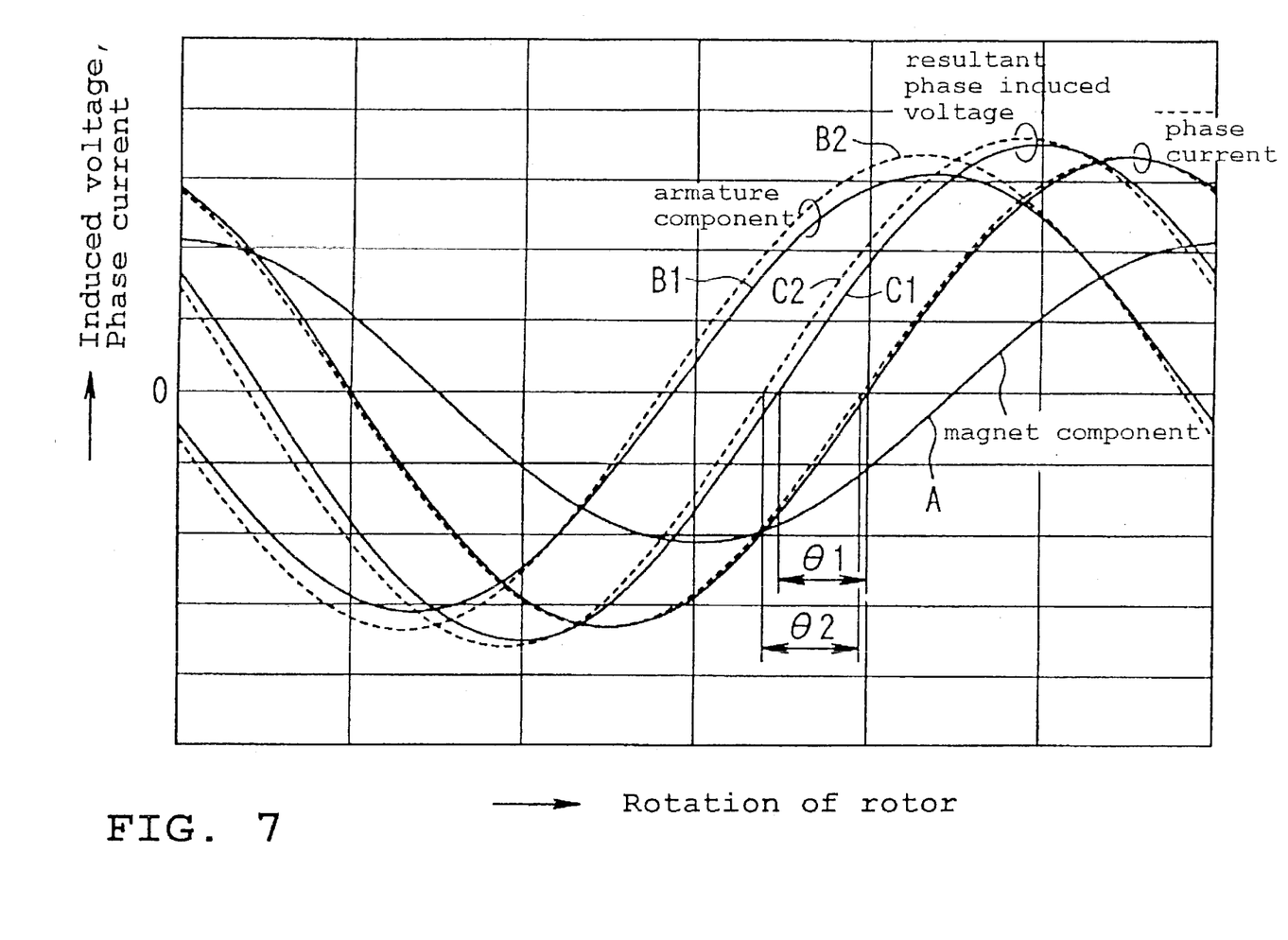
FIG. 7 is a graph showing a comparison of the magnet component of an induced voltage of a motor, the armature component of the induced voltage, the resultant induced voltage from these components, and a current flowing through the motor.

FIG. 7 is a graph showing a comparison between the fundamental wave of the magnet component of a phase induced voltage of a motor, the fundamental wave of the armature component of the same, the fundamental wave of the resultant phase induced voltage and a phase current flowing through the motor.

Studying the graph, magnet components of the phase induced voltage are approximately the same in either case of the rotor of the second embodiment and the conventional rotor, as shown in FIG. 7 by a solid line A.

In contrast, the armature component of the phase induced voltage is represented, in the case of the rotor of the second embodiment, by a curve shown in the solid line B1, which curve is shifted as shown in the figure as a whole compared with the conventional rotor shown in the dotted line B2. Therefore, the resultant phase induced voltage is represented, in the case of the rotor of the second embodiment, by a curve shown in the solid line C1, which curve is shifted as shown in the figure as a whole compared with the case of the conventional rotor shown in the dotted line C2.

Thus, comparing the phase difference of the resultant phase induced voltage of the motor and the phase current flowing through the motor, it comes to the value θ1 in the case of the rotor of the second embodiment, which is smaller than that in the case of the conventional rotor shown by the value θ2.

Figure 8:
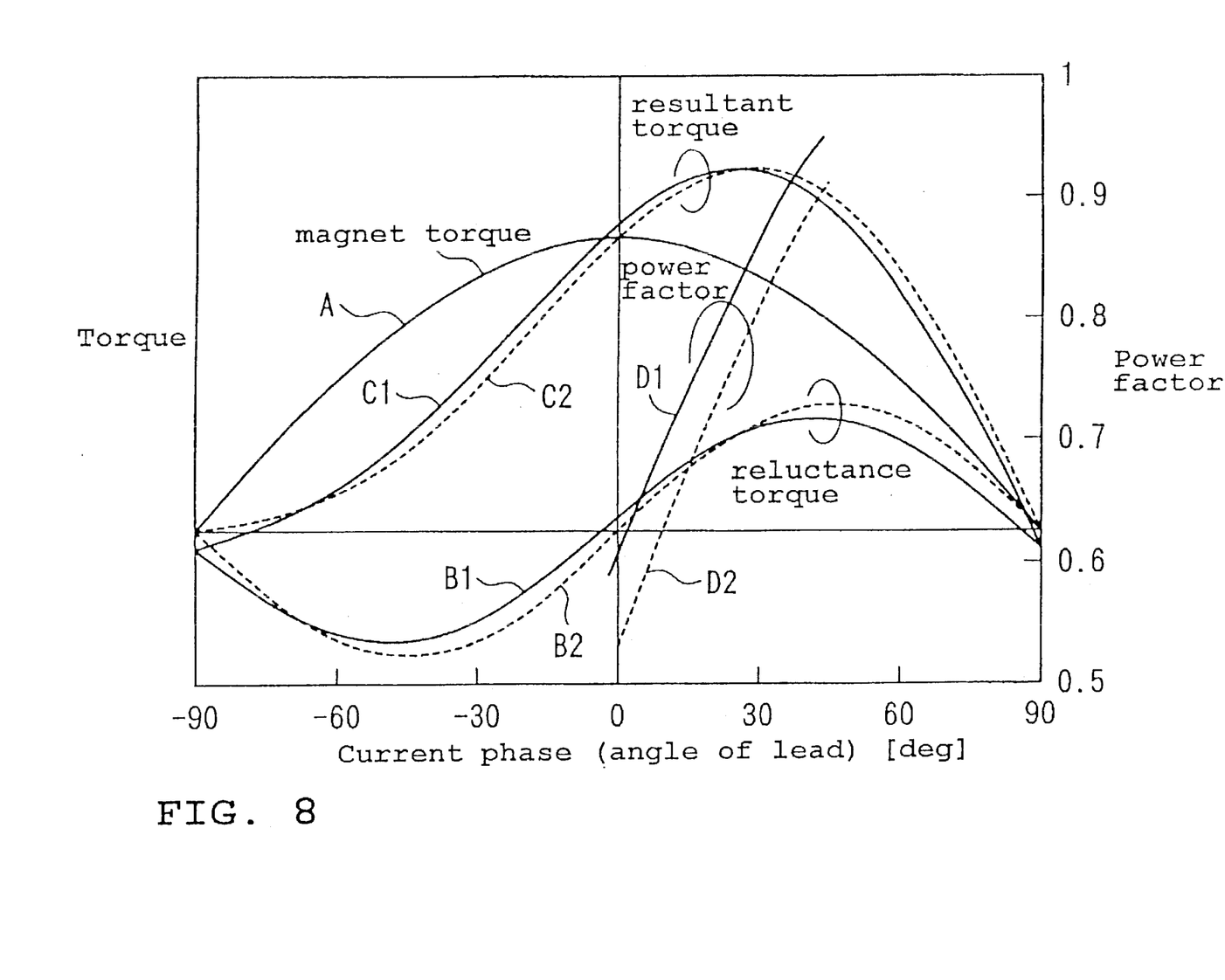
FIG. 8 is a graph showing a comparison of the magnet torque of a motor, the reluctance torque of the motor, the resultant torque from these torque components, and the power factor of the motor.

FIG. 8 is a graph showing a comparison between the magnet torque of a motor, the reluctance torque of the motor, the resultant torque from these torque components and the power factor of the motor.

Studying the comparison, first, the magnet torque takes approximately the same value in either case of the rotor of the second embodiment and the conventional rotor, as shown in FIG. 8 by the solid line A.

On the contrary, the reluctance torque is represented, in the case of the rotor of the second embodiment, by a curve shown in the solid line B1, which curve is shifted to the minus side of the current phase as a whole compared with the case of the conventional rotor shown in the dotted line B2.

Therefore, the resultant torque of the magnet torque and the reluctance torque is represented, in the case of the rotor of the second embodiment, by a curve shown in the solid line C1, and in the case of the conventional rotor by a curve shown in the dotted line C2. Thus, in the case of the rotor of the second embodiment, the maximum value is the same, but like the case of the reluctance torque, the curve is shifted to the minus side of the current phase as a whole.

However, as described above, the phase difference between the resultant phase induced voltage of a motor and the phase current flowing through the motor becomes smaller than in the case of the conventional rotor. Therefore, the power factor of the motor is represented, in the case of the rotor of the second embodiment, by a curve shown in FIG. 8 by the solid line D1, indicating improvement compared with the case of the conventional rotor shown in the dotted line D2.

The rotor 21 of the foregoing second embodiment is a rotor when the motor is of an inner rotor type. However, like the case of the rotor 21, the idea that part of the projection 25 related to generation of the reluctance torque is cut off, may be applied to a rotor when the motor is of an outer rotor type.

Now, the construction of the third embodiment of a rotor for a motor of this invention will be described with reference to FIG. 9.

In the rotor 21 of the foregoing second embodiment, since reluctance torque is utilized, the armature magnetic flux will increase. Therefore, the power factor of the motor will be lowered. To improve this power factor, it is necessary to suppress the armature magnetic flux, but this disadvantageously lowers the torque.

Figure 9A:
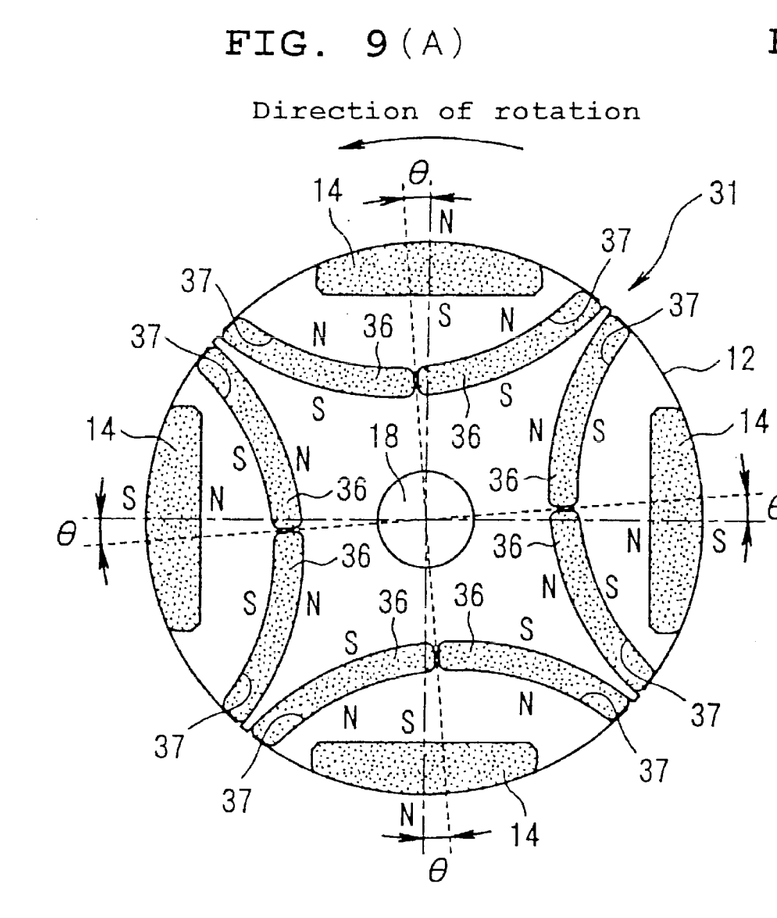
FIG. 9(A) is a plan view of the same, and FIG. 9(B) a side view of the same.
Figure 9B:
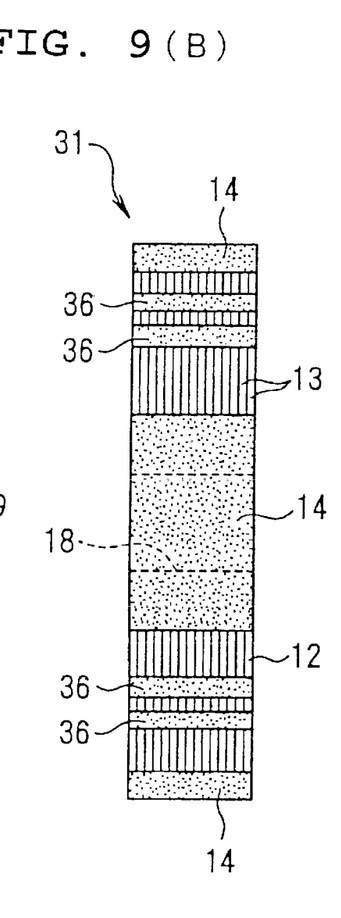

Thus, to eliminate such disadvantage, a rotor 31 according to the third embodiment is devised as shown in FIG. 9.

As shown in FIG. 9, the rotor 31 according to the third embodiment basically has the same construction as the rotor 11 shown in FIG. 1, except that mounting positions of arc-shaped permanent magnets 36 embedded in the core 12 are offset by a given angle θ in the direction of rotation of the rotor 31.

That is, the rotor 31 is arranged as shown in FIG. 9 such that in the core 12 between the permanent magnets 14 and the center of the core 12 are embedded arc-shaped permanent magnets 36 corresponding to the permanent magnets 14 and mounting positions of the permanent magnets 36 are offset by a given angle θ in the direction of rotation of the rotor 31 as a whole.

More specifically, the core 12 is formed with arc-shaped grooves 37 running along the permanent magnets 14 from near both ends of the permanent magnets 14. However, the grooves are arranged such that positions of the outside ends of the grooves 37 are not at an equal distance from both ends of the permanent magnets 14, but the distance on the forward side in the direction of rotation of the rotor 31 is larger than that on the rearward side. The arc-shaped permanent magnets 36 are housed fixedly in the arc-shaped grooves 37, respectively.

Otherwise, the construction is the same as that of the rotor 11 of the first embodiment, therefore like elements are designated by like numerals and description will be omitted.

According to the third embodiment of the foregoing construction, the characteristics can be improved, as in the second embodiment.

That is, according to the third embodiment, since not only little change in magnet torque is effected, but the peak phase can also be decreased in spite of a slight drop in reluctance torque, the peak value of the resultant torque is hardly lowered (see FIG. 8).

Further, since in addition to a drop in armature magnetic flux, its phase also changes, the phase difference between the phase induced voltage and phase current is decreased, improving the power factor of the motor (see FIG. 7 and FIG. 8).

The rotor 31 of the foregoing third embodiment is a rotor when the motor is of an inner rotor type. However, like the case of the rotor 31, the idea that mounting positions of the embedded permanent magnets 36 are off set by a given angle θ in the direction of rotation of the rotor 31 may be applied to a rotor when the motor is of an outer rotor type.

Now, the construction of the fourth embodiment of a rotor for a motor of this invention will be described with reference to FIG. 11.

Although in the foregoing third embodiment as shown in FIG. 9, the rotor 31 has been described in which permanent magnets 14 are mounted in the outer surface of the core 12 and one layer of permanent magnets 36 are embedded in the core 12, the fourth embodiment is arranged as follows.

Figure 11:
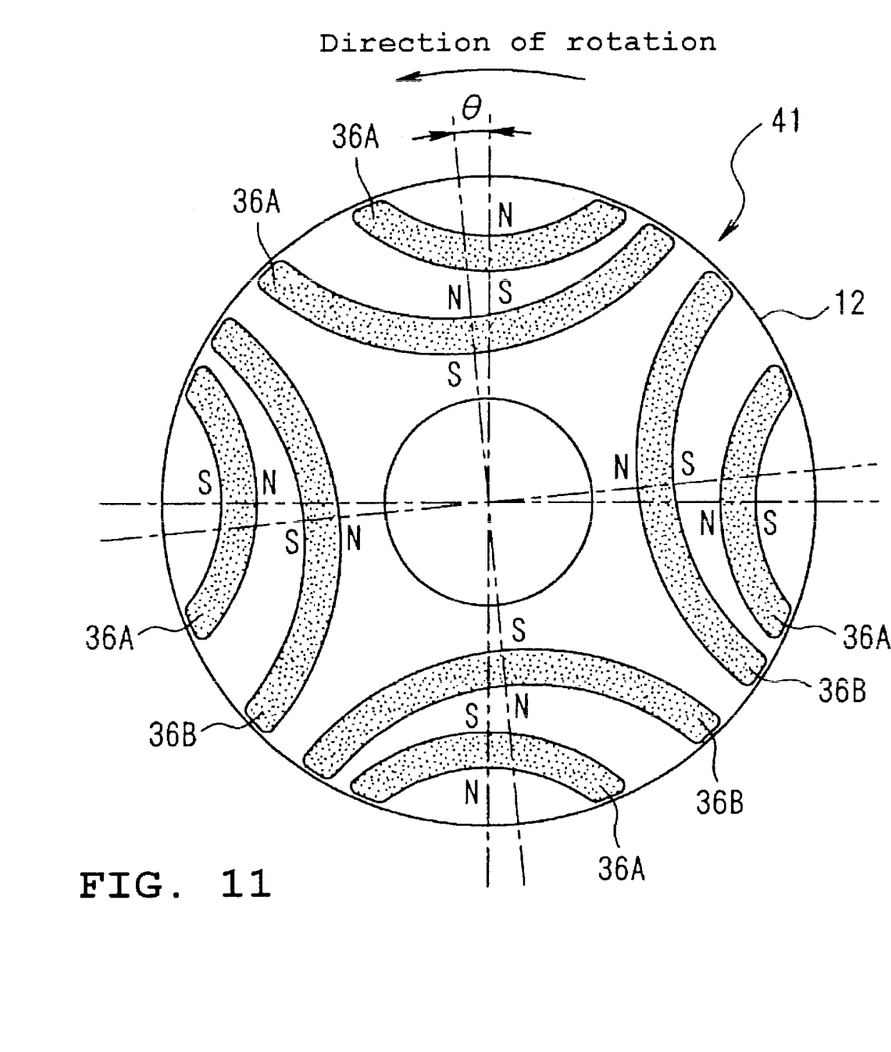
FIG. 11 is a plan view showing the construction of a fourth embodiment of a rotor for a motor of this invention.

That is, a rotor 41 of the fourth embodiment is arranged as shown in FIG. 11 such that permanent magnets 14 in the outer surface of the core 12 are omitted and multiple layers (two layers in this case) of permanent magnets 36A, 36B are embedded in the core 12. The mounting positions of the magnets 36B embedded on the inner side of the permanent magnets 36A, 36B are offset by an angle θ in the direction of rotation as shown in the figure.

As described above, according to the invention if the same total amount of permanent magnet as in a conventional surface magnet type rotor is used, a rotor for a motor can be provided capable of effecting improved motor torque variation due to improvement in magnetic density generated between the rotor and stator and thus improvement in the induced voltage waveform, and of effecting improved magnet torque due to an increase in armature interlinkage magnetic flux.

In addition, according to the invention not only a rotor can be provided capable of effecting improved efficiency of a PM motor utilizing reluctance torque, but effects are also produced of improvement in torque variation, magnet torque as well as the power factor.

Further, according to the invention, a rotor can be provided capable of effecting improved efficiency of a PM motor utilizing reluctance torque.

What is claimed is:

1. A rotor for use in matched relation with a stator provided in a permanent magnet type synchronous motor, characterized in that: the rotor comprises a core made of a ferromagnetic material, a given number of first permanent magnets are mounted in the outer surface of the core circumferentially at equal intervals, and the first permanent magnets are arranged such that polarities N, S of the first permanent magnets on the side facing the stator are disposed alternately, and that: in the core between the center axis of the core and the first permanent magnets are embedded second permanent magnets corresponding to the first permanent magnets, respectively, and arrangement of the second permanent magnets is the same as that of the corresponding first permanent magnets.

2. The rotor according to claim 1 wherein each of the plurality of first permanent magnets extends in an arc from the outer surface of the rotor toward the center axis of the core and back to the outer surface.

3. The rotor according to claim 2 wherein each of the plurality of embedded second permanent magnets further extends in the arc from the region between the center axis of the core and the corresponding one of the two adjacent first permanent magnets to a region between the corresponding one of the two adjacent first permanent magnets and an adjacent one of the first permanent magnets.

4. The rotor according to claim 3 wherein a position of each of the embedded second permanent magnets is offset in a direction of rotation of the core from a position of the corresponding first permanent magnet by a predetermined angle.

5. The rotor according to claim 1 wherein each of the plurality of embedded second permanent magnets further extends in the arc from the region between the center axis of the core and the corresponding one of the two adjacent first permanent magnets to a region between the corresponding one of the two adjacent first permanent magnets and an adjacent one of the first permanent magnets.

6. The rotor according to claim 5 wherein a position of each of the embedded second permanent magnets is offset in a direction of rotation of the core from a position of the corresponding first permanent magnet by a predetermined angle.

7. The rotor according to claim 1 wherein each of the plurality of first permanent magnets is mounted in contact with an outer peripheral edge of the outer surface of the rotor.

8. The rotor according to claim 7 wherein the plurality of embedded second permanent magnets are arranged in pairs comprising a first embedded second permanent magnet and a second embedded second permanent magnet; and wherein the first embedded second permanent magnet and the second embedded permanent magnet each extend in arcs from respective sides of one of the plurality of first permanent magnets to a region between the center axis of the core and the one of the plurality of first permanent magnets; and wherein ends of the first embedded second permanent magnet and the second embedded second permanent magnet in the region between the center axis of the core and the one of the plurality of first permanent magnets are adjacent one another.

9. The rotor according to claim 1 wherein the plurality of embedded second permanent magnets are arranged in pairs comprising a first embedded second permanent magnet and a second embedded second permanent magnet; and wherein the first embedded second permanent magnet and the second embedded permanent magnet each extend in arcs from respective sides of one of the plurality of first permanent magnets to a region between the center axis of the core and the one of the plurality of first permanent magnets; and wherein ends of the first embedded second permanent magnet and the second embedded second permanent magnet in the region between the center axis of the core and the one of the plurality of first permanent magnets are adjacent one another.

10. The rotor according to claim 9 wherein each of the plurality of embedded second permanent magnets is in contact with a portion of an outer peripheral edge of the outer surface of the rotor.

11. The rotor for a motor according to claim 1, wherein positions of the embedded second permanent magnets are offset from the mounting positions of the first permanent magnets by a predetermined angle in the direction of rotation of the core.

12. The rotor according to claim 11 wherein each of the first permanent magnets is mounted in contact with an outer peripheral edge of the outer surface of the rotor.

13. The rotor according to claim 12 wherein each of the first permanent magnets extends in an arc from the outer surface of the rotor toward the center axis of the core and back to the outer surface.

14. The rotor according to claim 13 wherein each of the embedded second permanent magnets is in contact with a portion of an outer peripheral edge of the outer surface of the rotor.

15. The rotor according to claim 13 wherein each of the embedded second permanent magnets is arc-shaped.

16. The rotor according to claim 11 wherein the embedded second permanent magnets are arranged in pairs comprising a first embedded second permanent magnet and a second embedded second permanent magnet; and wherein the first embedded second permanent magnet and the second embedded permanent magnet each extend in arcs from respective sides of a corresponding first permanent magnet to a region between the center axis of the core and the corresponding first permanent magnet; and wherein ends of the first embedded second permanent magnet and the second embedded second permanent magnet in the region between the center axis of the core and the corresponding first permanent magnets are adjacent one another.

17. A rotor for use in matched relation with a stator provided in a permanent magnet type synchronous motor, the rotor for a motor characterized in that: the rotor comprises a core made of a ferromagnetic material, a given number of permanent magnets are mounted in the outer surface of the core circumferentially at equal intervals, and the permanent magnets are arranged such that polarities N, S of the permanent magnets on the side facing the stator are disposed alternately, and that: the core is formed with projections between the permanent magnets mounted in the outer surface, and each projection has a cutout at the forward end in the direction of rotation of the core.

18. The rotor according to claim 17 wherein each of the permanent magnets is mounted in contact with an outer peripheral edge of the outer surface of the rotor.

19. The rotor according to claim 17 wherein each projection extends from a first one of the permanent magnets to an adjacent second one of the permanent magnets, and wherein each projection has an arc-shaped portion flush with the first one of the permanent magnets, the cutout in contact with the adjacent second one of the permanent magnets.

20. The rotor according to claim 19 wherein the cutout is a slanting portion of each projection extending from the arc-shaped portion to a point along a surface of the adjacent second one of the permanent magnets.

* * * * *